(12) United States Patent
Vratonjic et al.

(10) Patent No.: US 10,331,195 B2
(45) Date of Patent: Jun. 25, 2019

(54) POWER AND PERFORMANCE AWARE MEMORY-CONTROLLER VOTING MECHANISM

(71) Applicant: QUALCOMM Incorporated, San Diego, CA (US)

(72) Inventors: Milena Vratonjic, Santa Clara, CA (US); Harmander Singh, Cedar Park, TX (US); Gautam Kumar, Hyderabad (IN); Mohamed Roumi, Hyderabad (IN); Kenneth Marvin Gainey, Escondido, CA (US); Ashish Bajaj, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 15/468,039

(22) Filed: Mar. 23, 2017

(65) Prior Publication Data
US 2017/0351316 A1    Dec. 7, 2017

Related U.S. Application Data

(60) Provisional application No. 62/346,061, filed on Jun. 6, 2016.

(51) Int. Cl.
*G06F 1/32*     (2019.01)
*G06F 1/3225*   (2019.01)
(Continued)

(52) U.S. Cl.
CPC .......... *G06F 1/324* (2013.01); *G06F 1/3225* (2013.01); *G06F 13/1668* (2013.01); *G06F 13/1689* (2013.01); *Y02D 10/126* (2018.01)

(58) Field of Classification Search
CPC ........ G09G 5/395; G09G 5/363; G09G 5/393; G09G 5/001; G09G 5/222
See application file for complete search history.

(56) References Cited

U.S. PATENT DOCUMENTS 7,315,957 B1 * 1/2008 Wagner .............. G06F 1/06
                                                  713/501
9,142,001 B2 * 9/2015 Samson .............. G06F 1/3203
(Continued)

FOREIGN PATENT DOCUMENTS

EP      2818963 A1    12/2014
WO   WO-2015152578 A1  10/2015

OTHER PUBLICATIONS

International Search Report and Written Opinion—PCT/US2017/025174—ISA/EPO—dated May 30, 2017.
(Continued)

*Primary Examiner* — Todd Buttram
(74) *Attorney, Agent, or Firm* — Loza & Loza, LLP/Qualcomm (57) ABSTRACT

In some aspects, a method for adjusting an operating frequency of a memory controller is provided, wherein a graphics processing unit (GPU) accesses a memory via the memory controller. The method includes monitoring activity of the GPU to determine an active time of the GPU, comparing the determined active time with an active threshold, and, if the determined active time is greater than the active threshold, increasing the operating frequency of the memory controller.

30 Claims, 10 Drawing Sheets

(51) Int. Cl.
*G06F 1/324* (2019.01)
*G06F 13/16* (2006.01)

(56) References Cited

U.S. PATENT DOCUMENTS

| | | | |
|---|---|---|---|
| 9,250,665 B2 | 2/2016 | Avkarogullari et al. | |
| 9,304,570 B2 | 4/2016 | Schluessler et al. | |
| 2009/0063715 A1 | 3/2009 | De et al. | |
| 2011/0176372 A1* | 7/2011 | Baba | G06F 13/4239 365/189.05 |
| 2012/0159230 A1 | 6/2012 | Chen | |
| 2013/0179711 A1 | 7/2013 | Aelion et al. | |
| 2014/0071784 A1* | 3/2014 | Baliga | G11C 8/18 365/233.13 |
| 2014/0089699 A1 | 3/2014 | O'Connor et al. | |
| 2014/0184619 A1 | 7/2014 | Kim | |
| 2015/0106649 A1 | 4/2015 | Kannan | |
| 2015/0355692 A1 | 12/2015 | Paul et al. | |
| 2016/0070582 A1* | 3/2016 | Clovis | G06F 1/3296 710/104 |
| 2017/0108917 A1 | 4/2017 | Lee et al. | |

OTHER PUBLICATIONS

John Carter, et al.; "Impulse: Building a Smarter Memory Controller," IEEE, Fifth International Symposium on High-Performance Computer Architecture, Jan. 9-13, 1999, pp. 1-10.

Jeff Stuecheli; "Power8," IBM Power Systems, IBM Systems & Technology Group Development, International Business Machines Corporation, 2013, pp. 1-20.

Sailesh Kottapalli, et al.; "Nehalem-EX CPU Architecture," Intel Corporation, Sep. 10, 2009, pp. 1-19.

Ronak Singhal, "Inside Intel Core Microarchitecture (Nehalem)," Intel Corporation, Hot Chips 20, Aug. 26, 2008, pp. 1-25.

\* cited by examiner

TABLE I

| Use-case | GPU DCVS Tuning | | | |
| --- | --- | --- | --- | --- |
| | FHD Panel | | WQXGA panel | |
| | GPU utilization [%] | Optimal BIMC freq. [x Default] | GPU utilization [%] | Optimal BIMC freq. [x Default] |
| Powerlift | 52 | 1.6 | 66 | 1.7 |
| Controlled Scroll in Contacts | 43 | 1.3 | 69 | 1.8 |
| Controlled Scroll in Browser | 28 | 1.3 | 50 | 1.8 |
| Scroll Fling in Contacts | 54 | 1.7 | 75 | 1 |
| Scroll Fling in Browser | 26 | 2.4 | 46 | 3.3 |
| Angry Birds 60fps | 60 | 2.7 | 74 | 1.8 |
| Live Wallpaper Bubble | 13 | 1.6 | 18 | 2.7 |
| Egypt 60fps | 90 | 1.1 | 99 | 1 |

POWER AND PERFORMANCE AWARE MEMORY-CONTROLLER VOTING MECHANISM

RELATED APPLICATION

This application claims priority under 35 U.S.C. § 119(e) to U.S. Provisional Application No. 62/346,061 filed on Jun. 6, 2016, the entire specification of which is incorporated herein by reference.

BACKGROUND

Field

Aspects of the present disclosure relate generally to memory controllers, and more particularly, to power and performance aware memory-controller voting mechanisms.

Background

A system on a chip (SoC) may integrate a graphics processing unit (GPU), one or more central processing units (CPU) cores, communication cores (e.g., modem, WiFi circuitry, etc.), and device interfaces (e.g., USB interface, HDMI interface, etc.) on a single die. The GPU, the CPU cores and other processing blocks on the SoC may access a shared memory (also referred to as main memory) through a memory controller, which may be integrated on the SoC or may be external to the SoC. The memory controller is responsible for buffering and serving memory requests from the GPU, the CPU cores and other processing blocks that require access to the shared memory.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A first aspect relates to a method for adjusting an operating frequency of a memory controller, wherein a graphics processing unit (GPU) accesses a memory via the memory controller. The method comprises monitoring activity of the GPU to determine an active time of the GPU, comparing the determined active time with an active threshold, and, if the determined active time is greater than the active threshold, increasing the operating frequency of the memory controller.

A second aspect relates to a system. The system comprises a graphics processing unit (GPU), a memory controller configured to interface the GPU with a memory, and a frequency controller. The frequency controller is configured to monitor activity of the GPU to determine an active time of the GPU, to compare the determined active time with an active threshold, and, if the determined active time is greater than the active threshold, to increase an operating frequency of the memory controller.

A third aspect relates to a method for adjusting an operating frequency of a memory controller, wherein one or more processing units access a memory via the memory controller. The method comprises monitoring activity of the one or more processing units to determine an active time of the one or more processing units, comparing the determined active time with an active threshold, and, if the determined active time is greater than the active threshold, increasing the operating frequency of the memory controller.

A fourth aspects relates to a system. The system comprises one or more processing units, a memory controller configured to interface the one or more processing units with a memory, and a frequency controller. The frequency controller is configured to monitor activity of the one or more processing units to determine an active time of the one or more processing units, to compare the determined active time with an active threshold, and, if the determined active time is greater than the active threshold, to increase an operating frequency of the memory controller.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A system on a chip (SoC) may include a GPU, one or more CPU cores, communication cores (e.g., modem, WiFi circuitry, etc.), and device interfaces (e.g., USB interface, HDMI interface, etc.) integrated on a single die. The GPU, the CPU cores and other processing blocks on the SoC may access a shared memory (also referred to as main memory) through a memory controller, which may be integrated on the SoC or may be external to the SoC.

Figure 1:
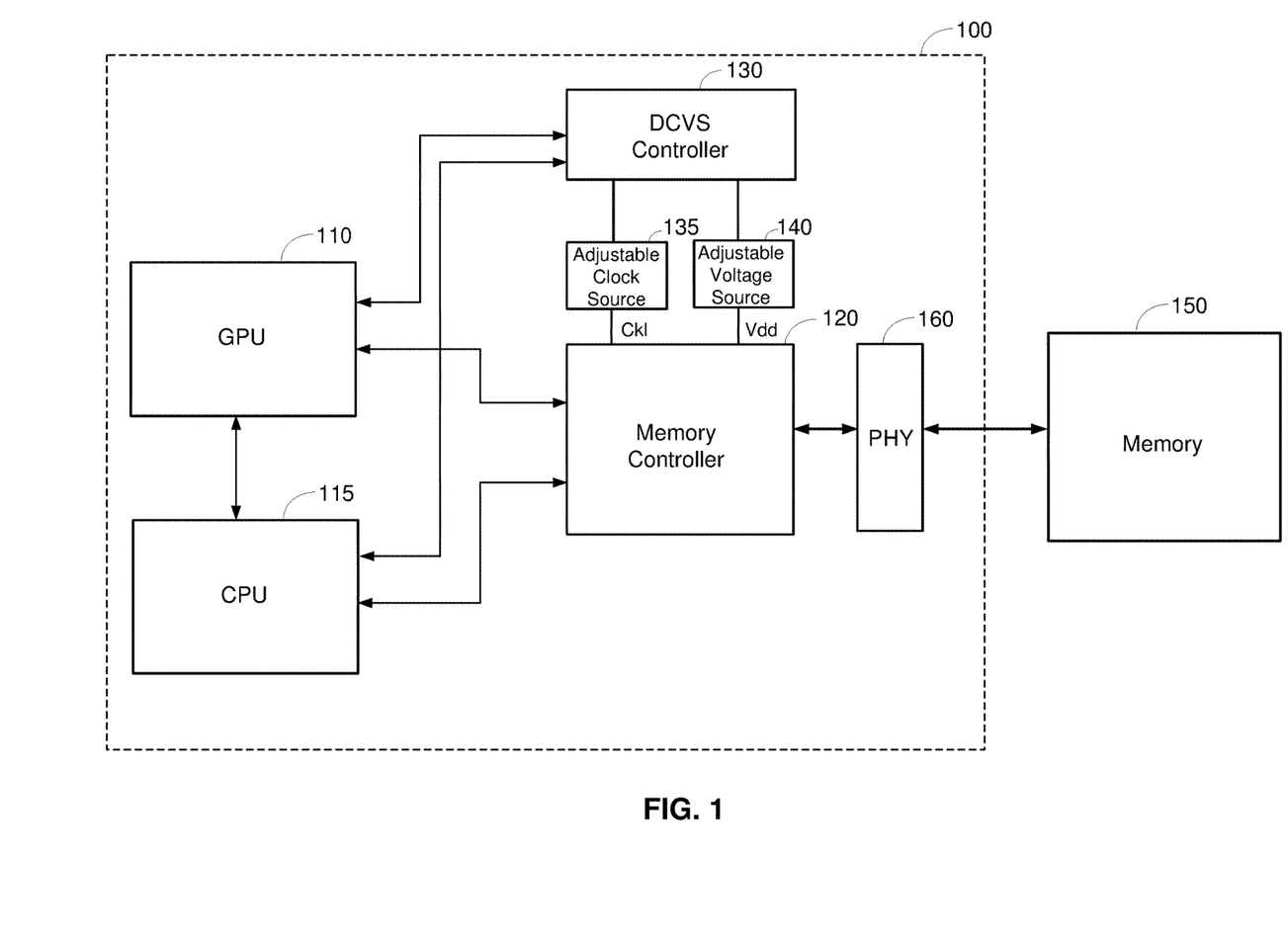
FIG. 1 shows an example of a system on a chip (SoC) including multiple processing blocks that access a shared memory according to certain aspects of the present disclosure.

In this regard, FIG. 1 shows an example of a SoC 100 including a GPU 110, and a CPU 115, which may include one or more CPU cores. The GPU 110 and the CPU 115 access a shared memory 150 through a memory controller 120. The shared memory 150 may comprise a double data rate (DDR) memory or another type of memory. The shared memory 150 is described below using the example of a DDR memory. However, it is to be appreciated that embodiments of the present disclosure are not limited to this example, and may be applied to other types of memory.

In the example shown in FIG. 1, the memory controller 120 is integrated on the SoC 100. In this example, the memory controller 120 may be referred to as an integrated memory controller (IMC), a bus-integrated memory controller (BIMC), or another terminology. However, it is to be appreciated that the memory controller 120 may alternatively be external to the SoC 100. The memory controller 120 is responsible for buffering and serving memory requests from the GPU 110 and the CPU 115, as discussed further below. It is to be appreciated that one or more other processing blocks (not shown in FIG. 1) on the SoC 100 may also access the memory 150 via the memory controller 120.

In the example in FIG. 1, the memory controller 120 communicates with the memory 150 via a physical (PHY) block 160. The PHY block 160 may be coupled to the memory 150 via one or more lines. The PHY block 160 may include one or more transceivers (not shown) for transmitting signals to and receiving signals from the memory 150 via the one or more lines. The PHY block 160 may also include timing circuits (not shown) for synchronizing (aligning) incoming and/or outing going signals (e.g., with a data strobe signal).

To write data to the memory 150, a processing block (e.g., GPU 110 or CPU 115) may send a write request to the memory controller 120. The write request may include the data and a logical address for the data. To service the write request, the memory controller 120 may map the logical address to a physical address in the memory 150, and send corresponding command/address/data signals to the memory 150 via the PHY block 160 to write the data to the physical address in the memory 150. The memory controller 120 may also send a signal to the processing block indicating that the write operation has been completed.

To read data from the memory 150, a processing block (e.g., GPU 110 or CPU 115) may send a read request to the memory controller 120. The read request may include a logical address for the data to be read from the memory 150. To service the read request, the memory controller 120 may map the logical address to a physical address in the memory, and send corresponding command/address signals to the memory 150 via the PHY block 160 to read the data from the physical address in the memory 150. Upon receiving the data from the memory 150, the memory controller 120 sends the data to the processing block.

The GPU 110 and CPU 115 may share the memory 150 on a time-shared basis. In other words, the GPU 110 and CPU 115 may access the memory 150 in a time multiplexed manner. For example, the memory controller 120 may receive read/write requests from the GPU 110 and CPU 115, place the read/write requests in a buffer (not shown), and process the read/write requests in the buffer one at a time. In this regard, the memory controller 120 may schedule and perform read/write operations to service the read/write requests in the buffer.

The memory controller 120 also may perform housekeeping operations such as refreshing the memory 150, performing ZQ calibrations, etc.

The memory controller 120 may support different operating frequencies. In this regard, the SoC 100 may include a dynamic clock voltage scaling (DCVS) controller 130, an adjustable clock source 135, and an adjustable voltage source 140. The adjustable clock source 135 is configured to provide a clock signal Clk having an adjustable frequency to the memory controller 120 for timing operations of the memory controller 120. In this example, the DCVS controller 130 may adjust the operating frequency of the memory controller 120 by adjusting the frequency of the clock signal Clk accordingly, as discussed further below. In this disclosure, the operating frequency of the memory controller 120 may be referred to as the memory controller (MC) frequency.

For the example in which the memory 150 comprises a DDR memory, the DDR frequency may be equal to or proportional to the MC frequency depending on the number of DDR channels between the memory controller 120 and the memory 150. For example, the DDR frequency may be twice the MC frequency when two DDR channels are used. Embodiments of the present disclosure are discussed below using the example of two DDR channels. However, it is to be appreciated that the present disclosure is not limited to this example.

The adjustable voltage source 140 is configured to provide a supply voltage Vdd having an adjustable voltage level to the memory controller 120 for powering the memory controller 120. In this example, the DCVS controller 120 may adjust the voltage level of the supply voltage Vdd over a voltage range by adjusting the voltage level of the adjustable voltage source 140 accordingly, as discussed further below.

In certain aspects, the adjustable clock source 135 may support a set of different frequencies including a minimum frequency, a maximum frequency, and one or more different frequencies between the minimum and maximum frequencies. In these aspects, the DCVS controller 130 may set the frequency of the clock signal Clk, and hence the MC frequency, to any one of the frequencies in the set. In one example, each frequency in the set may be paired with a corresponding supply voltage level that enables transistors in the memory controller 120 to switch fast enough to operate reliably at the frequency. For instance, a higher frequency may be paired with a higher supply voltage level than a lower frequency since a higher supply voltage level may be required to operate at the higher frequency. Thus, when the DCVS controller 130 sets the frequency of the clock signal Clk, and hence the MC frequency, to a particular frequency, the DCVS controller 130 may also set the supply voltage to the corresponding voltage level (i.e., the supply voltage level paired with the frequency). It is to be appreciated that two or more MC frequencies may be paired with the same supply voltage. The DCVS controller 130 may adjust the MC frequency and supply voltage level according to one or more DCVS algorithms, as discussed further below.

The DCVS controller 130 may also adjust the operating frequencies and supply voltages of the GPU 110 and CPU 115. For example, the SoC 100 may include an adjustable clock source (not shown) and an adjustable voltage source (not shown) for each of the GPU 110 and CPU 115 to allow the DCVS controller 130 to independently adjust the operating frequency and supply voltage of each of the GPU 110 and CPU 115. If the CPU 115 includes multiple cores, then the SoC 100 may include an adjustable clock source (not shown) and an adjustable voltage source (not shown) for each CPU core to allow the DCVS controller 130 to independently adjust the operating frequency and supply voltage of each CPU core.

The GPU 110 may be configured to efficiently perform imaging processing and/or graphics processing using a parallel structure to render frames for display to a user on a display. In this regard, the GPU 110 may render a certain number of frames a second depending on the frame rate (e.g., 30 frames per second (fps), 60 fps, etc.). For each frame or group of frames, the GPU 110 may be active for a period of time (active time) to process the frame or group of frames. After completing processing for the frame or group of frames, the GPU 110 may go into an idle state before processing the next frame or group of frames. During the time that the GPU 110 is active, the GPU 110 may need to access the memory 150 via the memory controller 120 to complete processing for the frame or group of frames.

The CPU 115 may also perform processing for the frames. For example, an application (e.g., a web browser, a game application, etc.) running on the CPU 115 may need to display images or video to the user on the display. In this regard, the CPU 115 may communicate rendering commands and data to the GPU 110 for the frames in order for the GPU 110 to render the frames. To do this, the CPU 115 may need to access the memory 150 via the memory controller 120 to complete its processing for the frames. Decreasing the time that the GPU 110 is active relaxes the timing requirements of the CPU 115 (increases the amount of time that the CPU 115 has to complete its portion of frame processing), which may result in a net reduction of power of the system, as discussed further below.

The DCVS controller 130 may adjust the MC frequency and DDR frequency using a demand based approach. In this approach, the DCVS controller 130 may find the memory MC frequency that satisfies system performance requirements to reduce power. In this regard, performance counters in a level-2 (L2) cache controller may be used and configured to count the read/write events that occur when data is transferred between cache and the memory 150 (main memory). The L2 cache may be used to temporarily store data on the SoC for the CPU 115 and/or GPU 110. The DCVS controller 130 may monitor the performance counters to determine how much data is transferred from the CPU 115, GPU 110, and/or other processing blocks that access the memory 150. The DCVS controller 130 may then use this information to appropriately scale the memory bus and DDR frequency. Effective bandwidth MB/s may then be used to compute a new higher MC frequency and, consequently, bus and DDR frequency to accommodate an increase in memory/write activity. The performance counters may be configured to continue monitoring the amount of data being transferred between the GPU's internal memory (GMEM) and the memory 150 and/or monitoring the amount of data being transferred between the CPU's cache and the memory 150.

Figure 2:
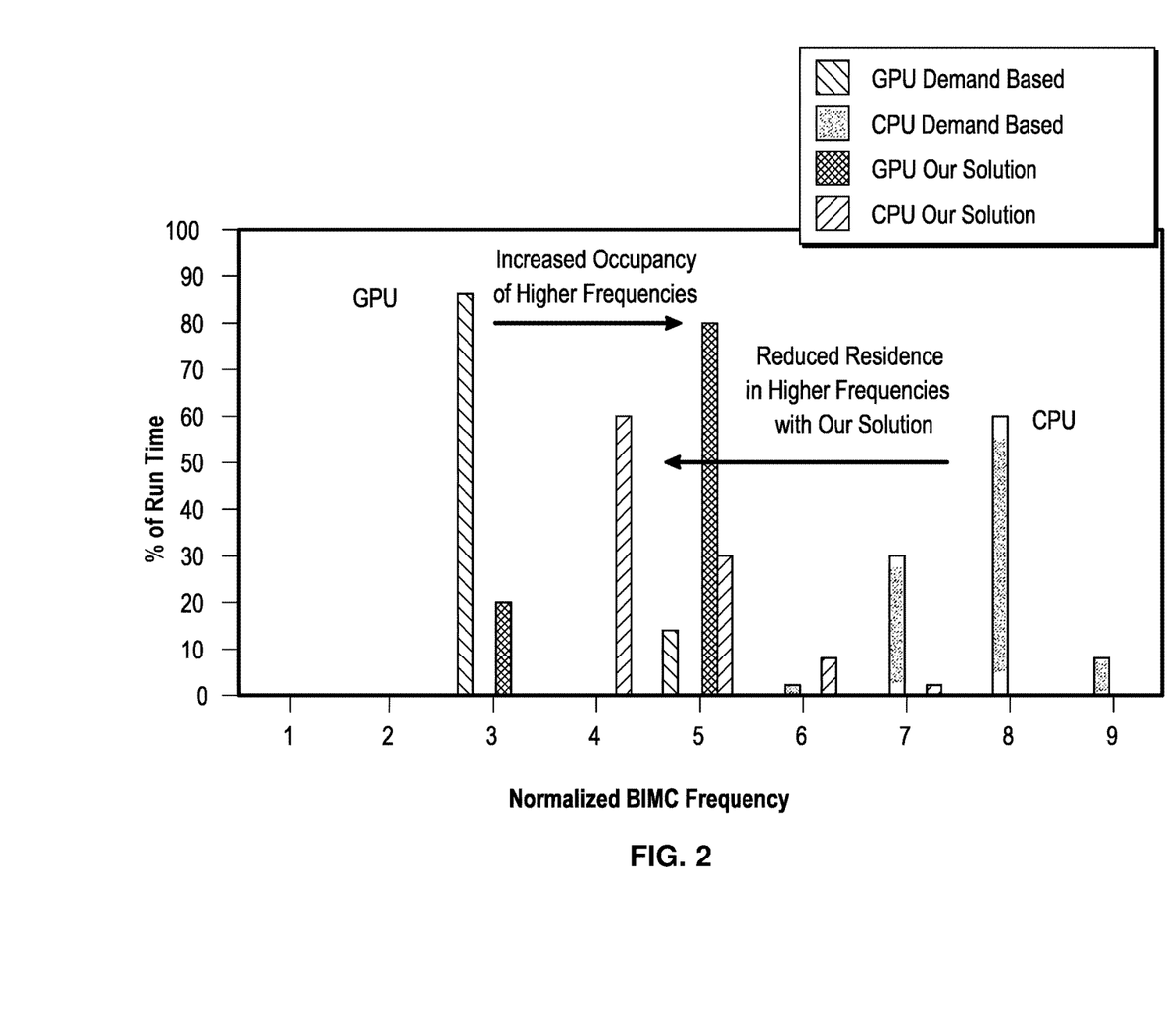
FIG. 2 is a plot illustrating an example of memory controller (MC) frequency occupancy for a demand-based approach and an approach in which the MC frequency is started at a higher frequency according to certain aspects of the present disclosure.

If performance requirements are not met, the DCVS controller 130 may bump up the GPU's and CPU's operating frequencies and adjust for higher MC frequency. With such a demand-based approach, lower MC frequencies are utilized more often, and power is effectively saved. FIG. 2 shows an example of the MC frequency occupancy for the GPU 110 and CPU 115 using a demand-based approach.

Embodiments of the present disclosure reduce total system power compared with the demand-based approach by using a higher MC frequency at the beginning of a use-case that has moderate to high GPU utilization. This allows the GPU 110, with its ability to execute a larger number of parallel threads, to access the memory 150 faster, and therefore complete its processing portion of an execution pipeline faster. This, in turn, relaxes the timing requirements of the CPU 115, which is more sensitive to tighter delay targets, resulting in a net reduction in total system power, as discussed further below.

According to certain embodiments, the DCVS controller 130 sets the memory controller 120 at a higher MC frequency at the start of a use-case run compared with the demand-based approach discussed above. This results in the GPU 110 occupying a higher MC frequency range, as opposed to the lower MC frequency range observed in the demand-based approach, as shown in FIG. 2. In contrast to the GPU 110, the CPU 115 occupies a lower MC frequency range compared with the demand-based approach (i.e., exhibits reduced occupancy of higher MC frequencies compared with the demand-based approach), as shown in FIG. 2, and will operate at lower CPU frequencies (shown later). This results in a total system power reduction and also improved system performance, as discussed further below.

Figure 3:
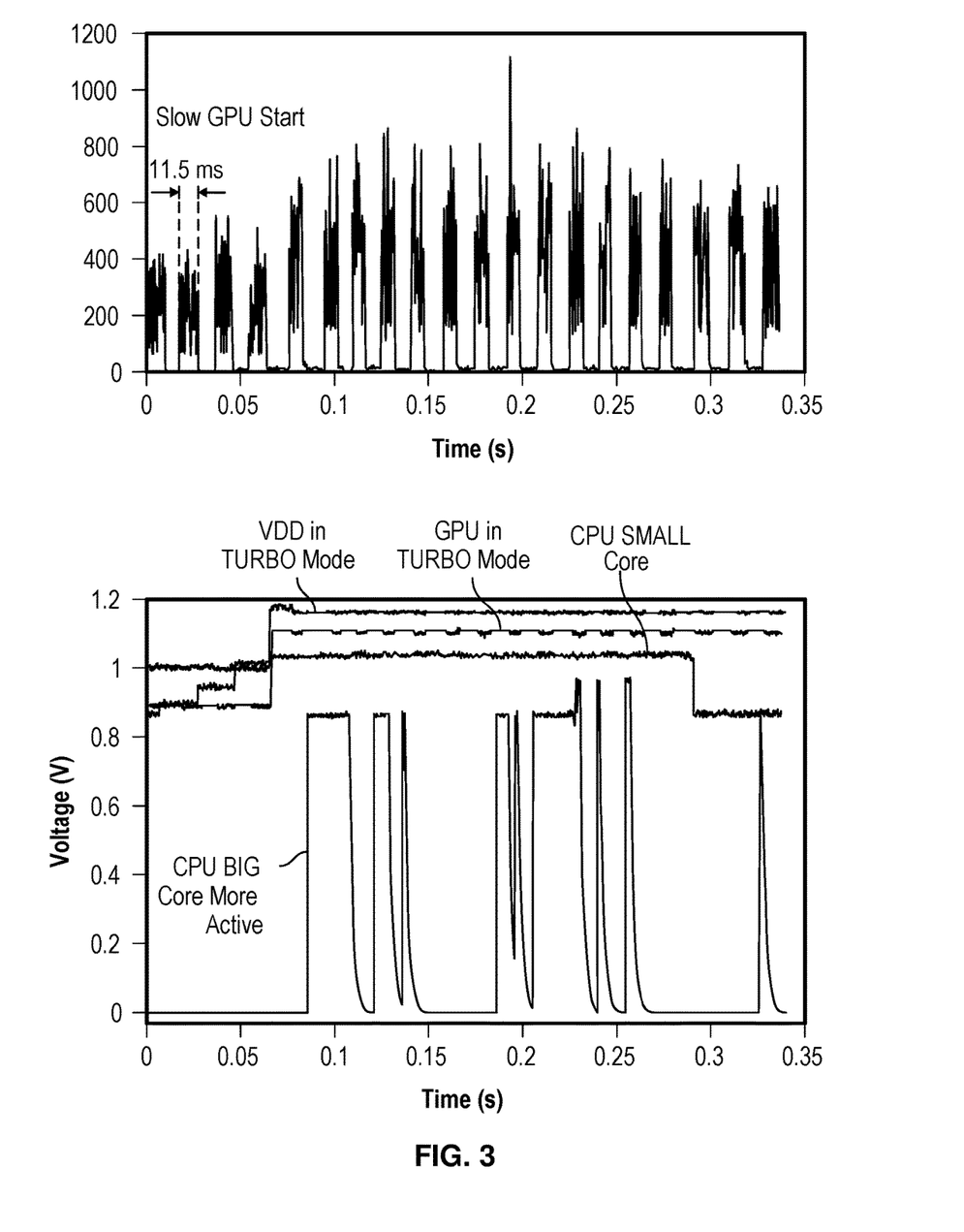
FIG. 3 shows an example of activity and voltage levels for a demand-based approach according to certain aspects of the present disclosure.

FIG. 3 shows an example of activity and voltage levels for the GPU 110, CPU 115 and memory controller 120 using the demand-based approach for a web-browser use-case example. In this example, the GPU rendering timeline initially starts at 11.5 ms. This slow start forces the DCVS algorithm for the CPU to increase both the CPU's operating frequency and the MC frequency so that it can compensate for the GPU's slow start and complete the run without performance degradation.

Figure 4:
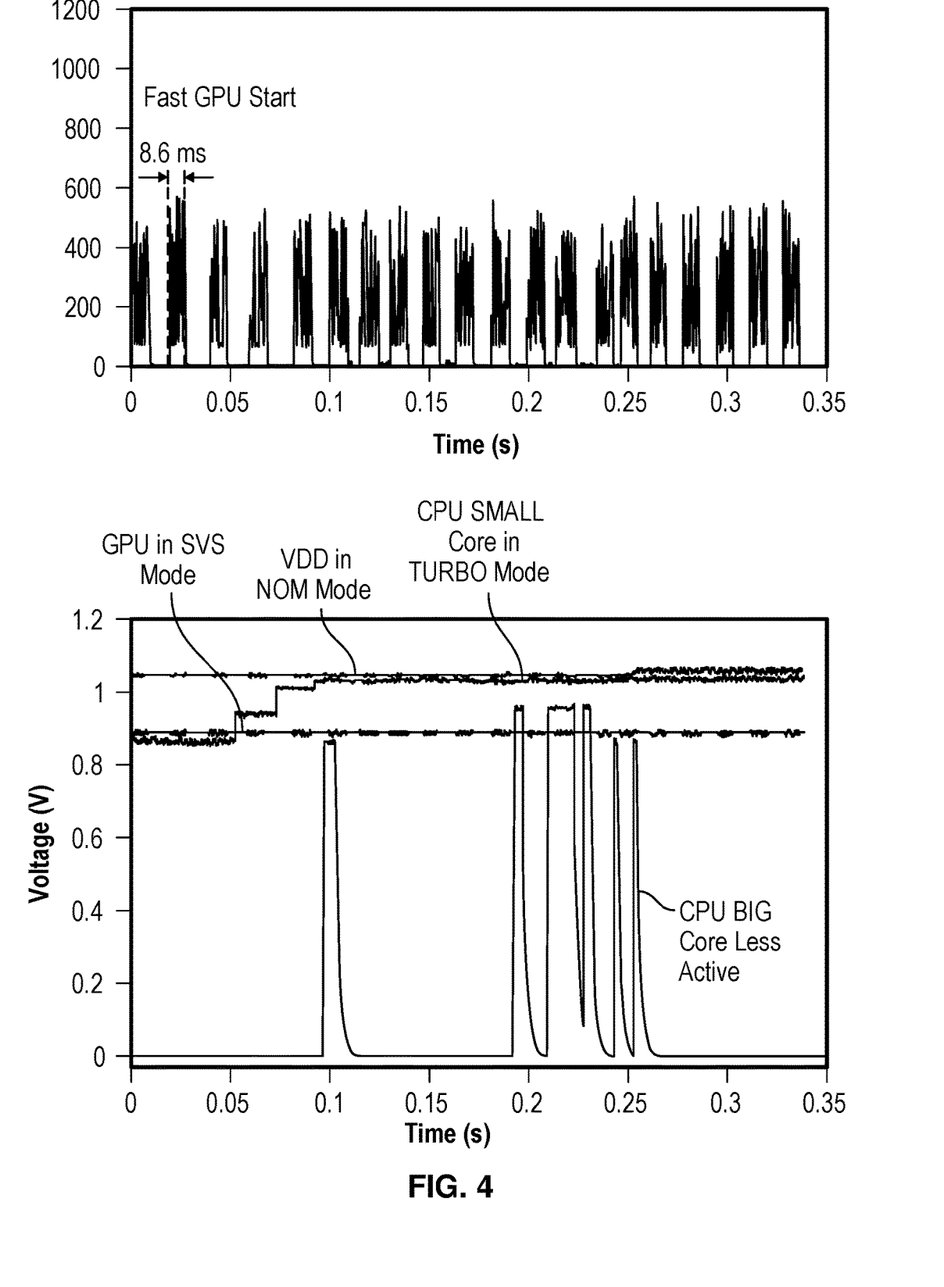
FIG. 4 shows an example of activity and voltage levels for an approach in which the MC frequency is started at a higher frequency compared with the demand-based approach shown in FIG. 3 according to certain aspects of the present disclosure.

FIG. 4 shows the activity and voltage levels for the GPU 110, CPU 115 and memory controller 120, in which the MC frequency is started at a higher level at the beginning of the run according to embodiments of the present disclosure. This allows the GPU 110 to complete its processing portion of the load faster. This, in turn, relaxes the timing requirements for the CPU portion of the execution pipeline. Considering that the CPU 115 is more sensitive and dominate in total power contribution, reducing the processing demand on the CPU side (while increasing it on the GPU) results in a reduced total power for a particular use-case.

A default MC frequency for a use-case may be determined by finding the minimum MC frequency that satisfies performance requirements. If the DCVS controller 130 has the memory controller 120 start at an initial MC frequency that is twice the default MC frequency, then the GPU active time is reduced from 11.5 ms shown in FIG. 3 to 8.6 ms shown in FIG. 4 for the web-browser use-case example. The higher MC frequency allows the GPU to complete its processing portion of the task faster and the demand on the CPU to complete its portion and run in time is now more relaxed. As can be seen from FIG. 3 and FIG. 4, the BIG core of the CPU 115, which dominates in the system power usage, is less active in the approach starting with the higher MC frequency as compared to the demand-based approach. The Small core of the CPU 115, which is more energy efficient than the BIG core, is instead utilized more often. The system is not forced to operate in TURBO mode, as can be seen from the system operating in the nominal mode (NOM mode) in FIG. 4. The nominal mode corresponds to a lower supply voltage than the TURBO mode. Also, the GPU 110 is not run in the TURBO mode and can operate in static voltage scaling (SVS) reduced voltage, thus further reducing total power. Performance is not degraded, yet total power is reduced.

Figure 5:
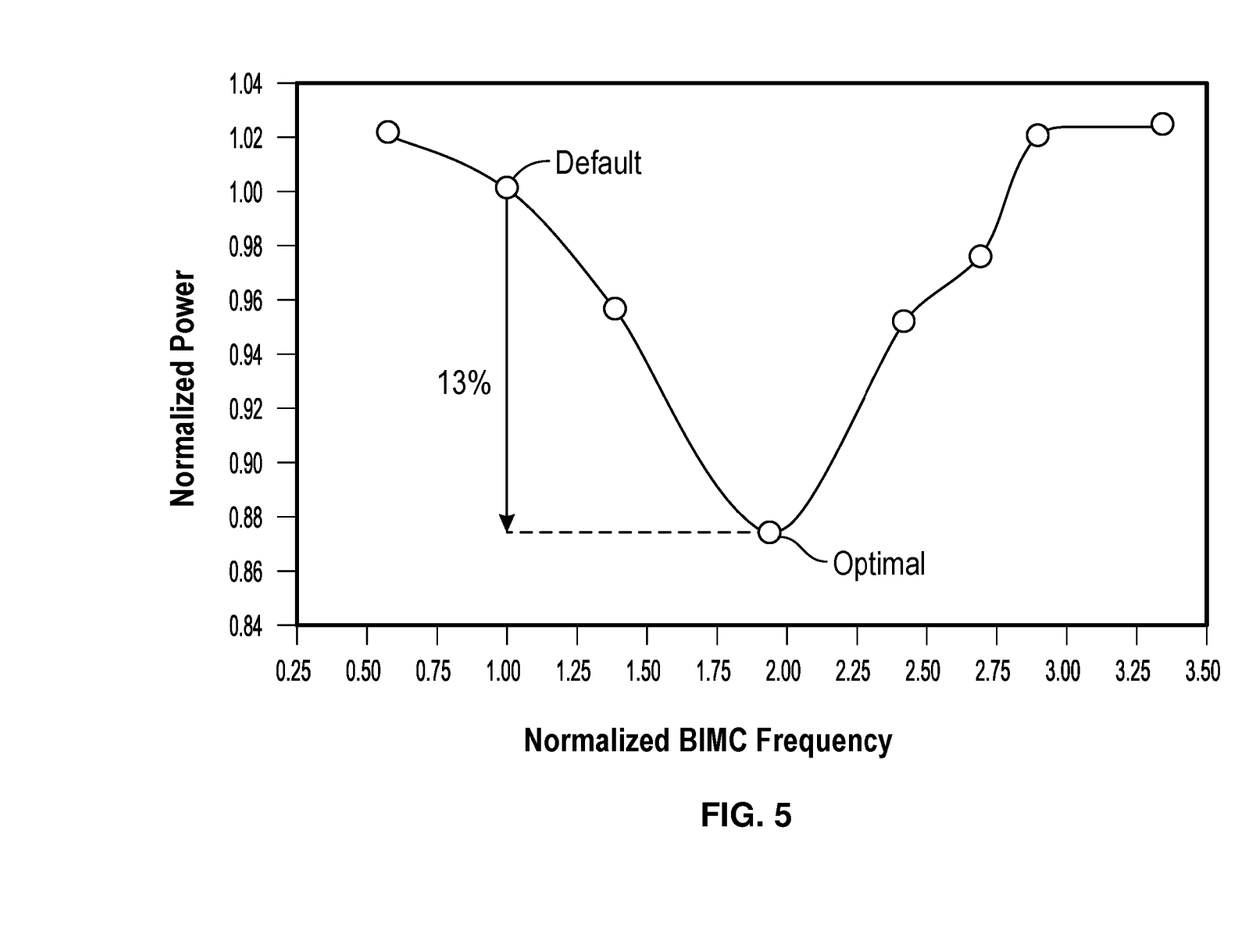
FIG. 5 shows an example of system power as a function of MC frequency according to certain aspects of the present disclosure.

FIG. 5 shows how the higher MC frequency discussed above may be determined for the example of the web-browser use-case. More particularly, FIG. 5 is a plot showing system power for different initial MC frequencies from the minimum MC frequency to the maximum MC frequency available in the system. In this example, even at the minimum frequency (which is about half the default frequency determined by the demand-based approach), the CPU will still complete the run without imposing performance degradation. The penalty is in the high power overhead, as the CPU's DCVS algorithm will have to request higher MC frequency and higher CPU operating frequencies to compensate for the slow GPU 110 start, similar to the behavior illustrated in FIG. 3. Thus, total power is much higher compared with starting the GPU 110 and memory controller 120 at higher frequencies. As the MC frequency is increased, the total power decreases until an optimal MC frequency is reached, as shown in FIG. 5. Continuing to increase the MC frequency beyond the optimal point does not translate into more power benefits, as shown in FIG. 5. This is because there is no further reduction in the GPU 110 timeline that the CPU 115 can utilize to reduce the demand on its timing, and the system overhead needed to support the higher MC frequencies outweighs any savings.

It should be noted that FIG. 5 illustrates the initial starting MC frequency that affects how the GPU dominated use-case sets the tone of how the rest of the run will be executed. This does not mean that the memory controller 120 will continually be set at default throughout the run, but rather illustrates the initial vote from the GPU 110 for the MC frequency. During the use-case run, the CPU 115 may still vote for MC frequencies that are higher than default, sometimes even higher than optimal, and that, in turn, results in higher power when the initial GPU vote for starting MC frequency is low.

Figure 6:
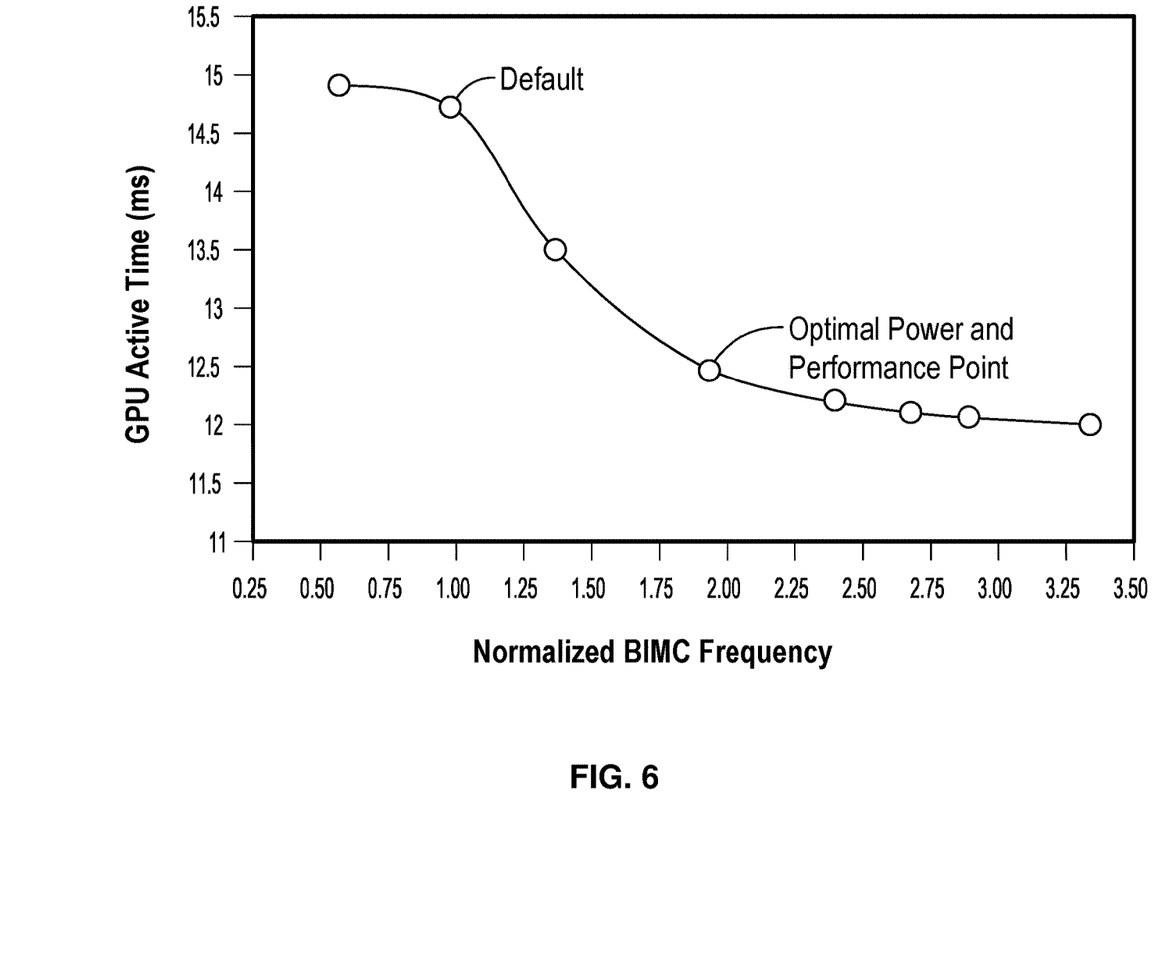
FIG. 6 shows an example of active time of a GPU as a function of MC frequency according to certain aspects of the present disclosure.

FIG. 6 is a plot showing an example of GPU active time as a function of MC frequency. As the MC frequency is increased, the GPU active time is reduced monotonically until a point is reached where the average activity flattens out. At this point, further reduction in the GPU active time is not significant even as the MC frequency is further increased. This is because the GPU activity reaches its capacity and further increases in frequency does not improve the GPU active timeline. Optimal power and performance point may coincide with a threshold in GPU active time at which the MC frequency reaches its optimum value. A statistical analysis may be performed to determine a threshold in GPU active time that corresponds to an optimum MC frequency for each one of a plurality of different use-cases. This threshold, which may be referred to as the active threshold, may be used in a DCVS algorithm (an example of which is described below) as an indicator that the optimal power and performance point has been reached.

The active threshold for a particular use-case may be determined using a variety of techniques. For example, GPU active time may be determined for a use-case for each one of the MC frequencies available in the system (example of which shown in the plot in FIG. 6). The GPU active time may correspond to rendering of a frame or group of frames. A slope may then be determined for each MC frequency corresponding to the rate of change of GPU active time with respect to frequency. The slope for a particular MC frequency may be determined, for example, by the difference in the GPU active time for the MC frequency and the next available MC frequency over the difference between the MC frequency and the next available MC frequency. Each slope may then be compared with a slope threshold (rate of change threshold), which may correspond to a relatively flat slope. In this example, the active threshold may correspond to the point (i.e., MC frequency and active time) at which the slope decreases to a slope that is equal to or less than the slope threshold. The slope threshold may correspond to a shallow slope so that the GPU active time curve (example of which is shown in FIG. 6) becomes relatively flat when the slope threshold is reached. This indicates that further increases in the MC frequency result in little to no improvement in the GPU active time to relax the timing requirements of the CPU.

In another example, a change in GPU active time may be determined for each available MC frequency as the difference in the GPU active time for the MC frequency and the next available MC frequency. Each change in GPU active time may then be compared with an active-time change threshold. In this example, the active threshold may correspond to the point (i.e., MC frequency and active time) at which the change in the active time decreases below the active-time change threshold. This indicates that further increases in the MC frequency result in little to no change in the GPU active time to relax the timing requirements of the CPU. The above may be performed for each available GPU frequency to determine an active threshold for each GPU frequency.

Figure 7:
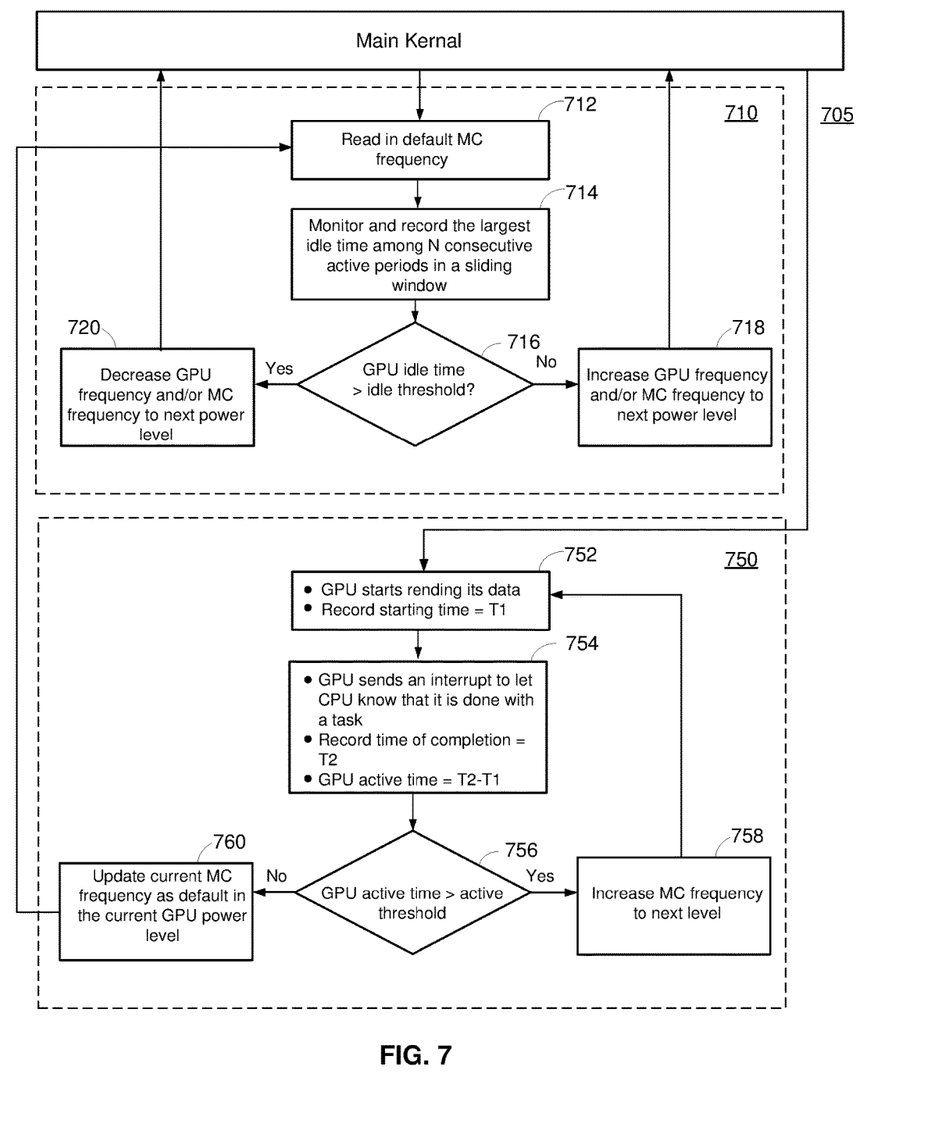
FIG. 7 is a flowchart illustrating a GPU dynamic clock voltage scaling (DCVS) algorithm according to certain aspects of the present disclosure.

FIG. 7 shows an exemplary GPU DCVS algorithm 705 according to certain aspects of the present disclosure. The GPU DCVS algorithm 705 may be performed by the DCVS controller 130, and includes a first DCVS algorithm 710 and a second DCVS algorithm 750, which are described in further detail below.

The first DCVS algorithm 710 monitors idle time durations between active periods of the GPU 110. At step 712, the first DCVS algorithm 710 may start with a default MC frequency. At step 714, the first DCVS algorithm 710 monitors the idle time between the times when the GPU 110 is active by picking the largest idle period (gap) among N consecutive active periods of the GPU 110 in a sliding window manner. Each active period may correspond to rendering of a frame or group of frames for display. In this example, during each active period, the GPU 110 may access the memory 150 via the memory controller 120 to access data needed to render the respective frame or group of frames. At step 716, the first DCVS algorithm 710 compares the largest idle time from step 714 with an idle threshold. If the largest idle time in the sliding window is larger than the idle threshold, then the first DCVS algorithm 710 decreases the power level by decreasing the GPU frequency and/or MC frequency at step 720. If the largest idle time in the sliding window is less than the idle threshold, then the first DCVS algorithm 710 increases the power level by increasing the GPU frequency and/or MC frequency.

Each power level may correspond to a predefined GPU frequency and a default MC frequency. It is possible that, for the same GPU frequency, that there exist several predefined default MC frequencies. Each pair (e.g., {GPU freq$_1$, MC default freq$_1$}, {GPU freq$_1$, MC default freq$_2$}) corresponds to a separate power level. At a given power level, determined by the DCVS algorithm, the GPU starts with a preset (i.e., default) MC frequency at the beginning of a use-case run at step 712, as shown in FIG. 7.

The second DCVS algorithm 750 monitors the active time of the GPU 110. In one example, the second DCVS algorithm 750 may determine the active time of the GPU 110 as follows. At step 752, the second DCVS algorithm 750 records the time that the GPU 110 starts rendering data (e.g., for a frame or group of frames) as time T1. At step 754, the second DCVS algorithm 750 records the time that the GPU 110 completes the rendering as time T2, and determines the active time as the difference between time T2 and time T1. The completion time may be indicated by an interrupt sent by the GPU 110 to the CPU 115 to let the CPU know that the GPU is done.

At step 756, the second DCVS algorithm 750 compares the active time of the GPU 110 to the active threshold discussed above. If the active time is greater than the active threshold, then the second DCVS algorithm 750 increases the MC frequency at step 758 to facilitate a reduction in the GPU's active time, as depicted in FIG. 6. The second DCVS algorithm 750 may then return to step 752, and repeat step 752, 754 and 756. The second DCVS algorithm 750 may do this until the GPU's active time is equal to or below the active threshold. At this point, the optimal MC frequency is reached. The second DCVS algorithm 750 may then record the current MC frequency and set the recorded MC frequency as a new default starting MC frequency for the current power level at step 760. The new default stating MC frequency may be used as the default MC frequency in step 712, as shown in FIG. 7. For example, if the first DCVS algorithm 710 defines that the GPU power level was {GPU freq$_1$, MC default freq$_2$}), then the same power level is updated to {GPU freq$_1$, MC optimal freq$_2$}), where the optimal MC frequency is determined by the second DCVS algorithm, as discussed above.

For the example in which an active threshold is determined for each GPU frequency, the active threshold corresponding to the current GPU frequency may be used for the active threshold in step 756.

It takes only a few active GPU cycles for the GPU DCVS algorithm 705 to be fully effective in the current run of a use-case that is being executed. Already in the second run of the same use-case, the GPU DCVS algorithm 705 will have a new optimal starting MC frequency that was determined and updated in the previous run. The GPU DCVS algorithm 705 continuously monitors system requirements, and the second DCVS algorithm 750 allows the GPU DCVS algorithm 705 to achieve minimum system power for each use-case.

Figure 8:
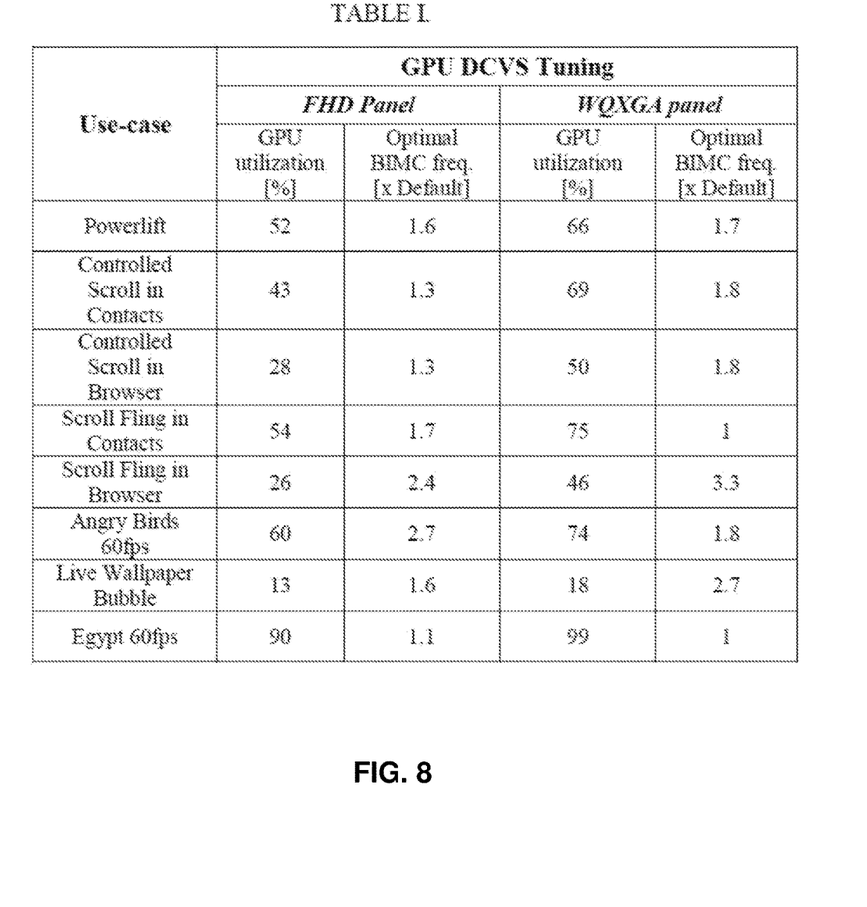
FIG. 8 is a table showing GPU utilizations and starting MC frequencies for different use-cases according to certain aspects of the present disclosure.

In use-cases with moderate to high GPU utilization, the second DCVS algorithm 750 determines a starting MC frequency that is higher than the default MC frequency determined by the demand-based algorithm, as shown in FIG. 8. FIG. 8 shows a table (TABLE 1) listing several examples of typical use-cases for a mobile SoC. For each use-case, the table shows GPU utilization and a ratio of the optimal MC frequency to the default MC frequency for two different displays (FHD Panel and WQXGA panel).

In use-cases where GPU is fully utilized, the initial (default) MC frequency is already very high. Further increases of the MC frequency does not help reduce total system power because the reduction in active GPU time is negligible whereas the cost in terms of power for the system to support and run at such high MC and DDR frequencies is very high. This is the case for "Egypt 60 fps" use-case in the Table 1. For all other use-cases in Table 1 with moderate to high GPU utilization (13%-75%), the optimal MC frequency is 1.3 to 3.3 times larger than the default MC frequency.

Figure 9:
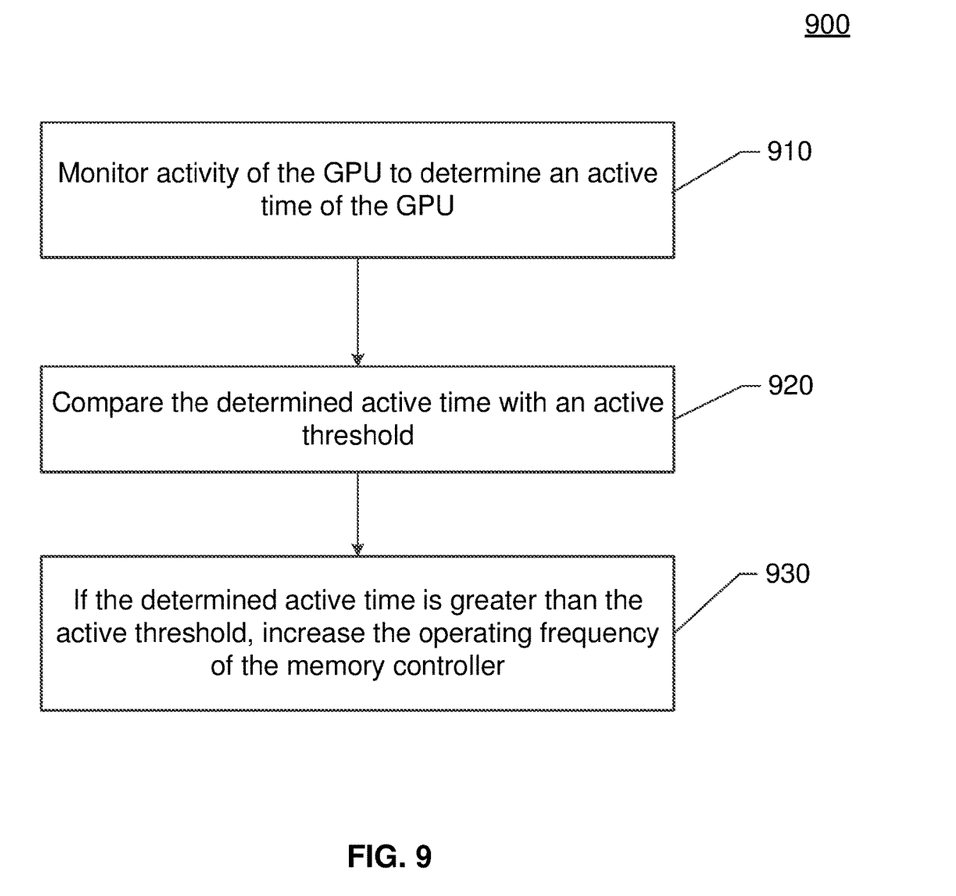
FIG. 9 is a flowchart illustrating an example of a method for adjusting an operating frequency of a memory controller according to certain aspects of the present disclosure.

FIG. 9 is a flowchart illustrating a method 900 for adjusting an operating frequency of a memory controller according to certain aspects of the present disclosure. A GPU (e.g., GPU 110) accesses a memory (e.g., memory 150) via the memory controller (e.g., memory controller 120). The method 900 may be performed by the DCVS controller 130.

At step 910, the DCVS controller 130 monitors activity of the GPU to determine an active time of the GPU. For example, the DCVS controller 130 may determine the active time by recording a time T1 that the GPU starts rendering data (e.g., one frame or a group of frames), recording a time T2 that the GPU completes rendering the data, and computing the difference between time T2 and time T1. The completion time T2 may be indicated by an interrupt signal output by the GPU.

At step 920, the DCVS controller 130 compares the determined active time with an active threshold. The active threshold may correspond to an active time at which a rate of change of active time with respect to the operating frequency of the memory controller (MC frequency) becomes small, as discussed above with reference to FIG. 6.

At step 930, if the determined active time is greater than the active threshold, the DCVS controller 130 increases the operating frequency of the memory controller. In this case, steps 910 to 930 may be repeated until the active time is equal to or less than the active threshold.

Although the present disclosure is discussed above using the example of a GPU, it is to be understood that embodiments of the present disclosure are not limited to this example. For example, embodiments of the present disclosure may be extended to monitor the activity of other processing units (also referred to as processing blocks) in addition to or instead of the GPU.

In general, a method for adjusting an operating frequency of a memory controller (e.g., memory controller 120) according to aspects of the present disclosure may include monitoring activity of one or more processing units to determine an active time of the one or more processing units, comparing the determined active time with an active threshold, and, if the determined active time is greater than the active threshold, increasing the operating frequency of the memory controller. The one or more processing units may include the GPU 110, the CPU 115, a digital signal processor (DSP), or any combination thereof.

In some aspects, the one or more processing units comprise a plurality of processing units that access the memory 150 via the memory controller 120 and share the bandwidth resources thereof. In these aspects, the active time of the plurality of processing units can be a function of the actual active time of each processing unit and the respective power of each processing unit. The respective power of each processing unit may be a percentage contribution of the processing unit to the total power of the plurality of processing units and/or the total power of the system that is being optimized for power and/or speed. In one example, the percentage contribution of each processing unit may be given as a "weight coefficient" that is proportional to the power of the processing unit out of the total power of the plurality of processing units and/or the total power of the system that is being optimized for power and/or speed. In this example, the active time of the plurality of processing units may be a weighted sum of the active times of the processing units, in which the active time of each processing unit is weighted by the respective weight coefficient. Such function can be determined for each system that is being optimized to be representative of the interaction of the processing units and used as an "indicator" of whether the "threshold" (which may signify an optimum point) is reached and whether the operating frequency of the memory controller should be further increased.

In a first scenario of GPU 110 and CPU 115 interaction, only GPU activity is monitored. In this case "activity" is really the activity in terms of rendering time (rendering time of a frame or a group of frames).

In a second scenario, the activity of both the GPU 110 and CPU 115 is monitored. In this case, the active time of the GPU 110 and CPU 115 is given by a function of GPU activity, CPU activity and their respective power weights. The active time of the GPU 110 and CPU 115 is monitored as the MC frequency of the memory controller 120 is increased until the threshold (e.g., optimum) is reached. The function itself represents the "activity" that is referred to in the first scenario described above.

In a third scenario, the activity of the GPU 110, the CPU 115 and the DSP is monitored. In this case, the active time of the GPU 110, the CPU 115 and the DSP is given by a function of GPU activity, CPU activity, DSP activity and their respective weights. The active time of the GPU 110, the CPU 115 and the DSP is monitored as the MC frequency of the memory controller 120 is increased until the threshold (e.g., optimum) is reached.

In certain aspects, the active time of a CPU may be defined as the time it takes the CPU to complete a processing operation (e.g., operation for one frame or a group of frames). For example, the CPU may perform the operation over a number of clock cycles of the CPU clock. In this example, if the clock frequency equals 1/T (where T is the time duration (period) of one clock cycle), then the higher the clock frequency, the smaller T will be. Thus, if it takes a certain number of clock cycles to complete a processing operation, then the higher clock frequency (i.e., smaller T) translates into a shorter active time. Vice versa, if the clock frequency is lower (and therefore T is larger), the same number of clock cycles to complete the processing operation translates into a longer active time.

The active time of a DSP may be defined in a similar manner as the active of the CPU discussed above, in which it takes the DSP a certain number of clock cycles of the DSP clock to complete a processing operation.

In certain aspects, the active time of a CPU may be defined in terms of system kernel. In these aspects, the active time of the CPU is the time spent running code in the operating system kernel, servicing interrupts and/or managing resources.

In certain aspects, a higher memory frequency means that access to the memory 150 is faster, and therefore the CPU does not have to operate as fast to manage all the fighting (contention) among the other processing units for memory resources. In this case, the "active time" that the CPU needs to execute certain code can be longer and its operating frequency thus relaxed. This is because the faster memory frequency allows the GPU to access the memory faster, providing more time for the CPU to access the memory.

In certain aspects, the DCVS controller 130 compares the active time of the plurality of processing units with a threshold (which may signify an optimum point). If the active time of the plurality of processing units is greater than the threshold, then the DCVS controller 130 increases the operating frequency of the memory controller 120. In the example in which the weight coefficient of each processing unit is proportional to the processing unit's contribution to the total power of the plurality of processing units and/or the total power of the system that is being optimized for power and/or speed, the active time of a processing unit that contributes more to the total power is weighted more than the active time of a processing unit that contributes less to the total power. Thus, in this example, the DCVS controller 130 determines whether to increase the operating frequency of the memory controller 120 further based on power considerations (e.g., increases the operating frequency of the memory controller 120 until the total power is optimized).

In certain aspects, the DCVS controller 130 may also take into consideration performance requirements in determining whether to increase the operating frequency of the memory controller 120 further. In this regard, the DCVS controller 130 may skew the weight coefficients of the processing units based on performance requirements. For example, the DCVS controller 130 may push (increase) the performance of a processing unit to meet a certain performance requirement for the processing unit by increasing the weight coefficient of the processing unit.

In one example, the performance requirement for a processing unit (e.g., CPU) may change based on the task (e.g., web browsing, gaming, etc.) being performed by the processing unit. In this example, a table stored in memory may map each one of a plurality of different tasks that may be performed by the processing unit (e.g., CPU) to a respective performance requirement, in which a higher performance requirement may correspond to a larger increase in the respective weight coefficient. When the processing unit performs a certain task, the DCVS controller 130 may determine the corresponding performance requirement for that task by consulting the table, and adjust (skew) the respective weight coefficient according to the performance requirement.

Figure 10:
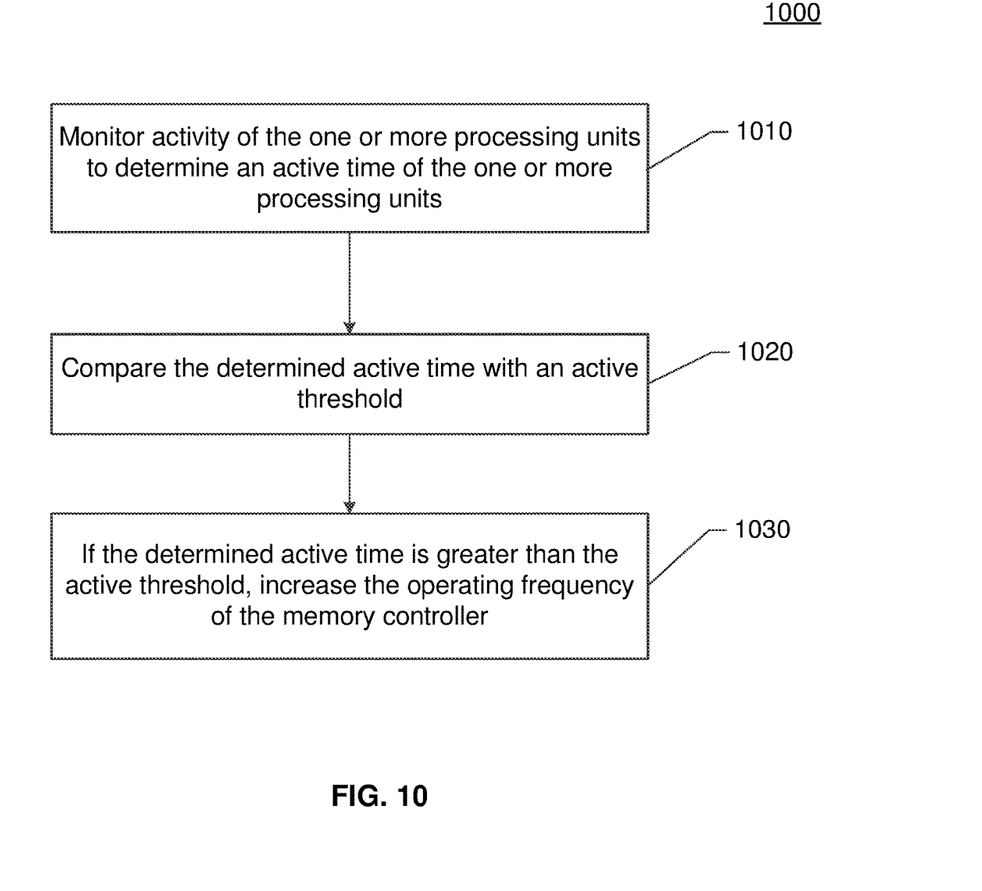
FIG. 10 is a flowchart illustrating another example of a method for adjusting an operating frequency of a memory controller according to certain aspects of the present disclosure.

FIG. 10 is a flowchart illustrating a method 1000 for adjusting an operating frequency of a memory controller according to certain aspects of the present disclosure. One or more processing units (e.g., GPU 110, CPU 115 and/or a DSP) access a memory (e.g., memory 150) via the memory controller (e.g., memory controller 120). The method 1000 may be performed by the DCVS controller 130.

At step 1010, the DCVS controller 130 monitors activity of the one or more processing units to determine an active time of the one or more processing units. For example, if the one or more processing unit comprise a plurality of processing units, then the active time may be a weighted sum of the active times of the processing units. In this example, the weight coefficient of each of the processing units may be proportional to the processing unit's contribution to the total power of the plurality of processing units and/or the total power of the system that is being optimized for power and/or speed. In some aspects, the weight coefficient of each processing unit may be adjusted (skewed) based on power requirement of the processing unit.

At step 1020, the DCVS controller 130 compares the determined active time with an active threshold.

At step 1030, if the determined active time is greater than the active threshold, the DCVS controller 130 increases the operating frequency of the memory controller.

The DCVS controller discussed above may be implemented with a general-purpose processor, a digital signal processor (DSP), an application specific integrated circuit (ASIC), a field programmable gate array (FPGA) or other programmable logic device, discrete hardware components (e.g., logic gates), or any combination thereof designed to perform the functions described herein. A processor may perform the functions described herein by executing software comprising code for performing the functions. The software may be stored on a computer-readable storage medium, such as a RAM, a ROM, an EEPROM, an optical disk, and/or a magnetic disk.

It is to be appreciated that aspects of the present disclosure are not limited to the exemplary terminology used above. For example, it is to be appreciated that a DCVS scheme may also be referred to as a dynamic voltage and frequency (DVFS) scheme or other terminology.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method for adjusting an operating frequency of a memory controller, wherein a plurality of processing units access a memory via the memory controller, the method comprising:
   monitoring activity of the plurality of processing units to determine an active time of each of the plurality of processing units;
   determining an active time for the plurality of processing units by a function of an active time of each of the plurality of processing units and a respective power of each of the plurality of processing units;
   comparing the determined active time for the plurality of processing units with an active threshold; and
   if the determined active time for the plurality of processing units is greater than the active threshold, increasing the operating frequency of the memory controller.

2. The method of claim 1, wherein the memory comprises a double data rate (DDR) memory, and wherein the increasing the operating frequency of the memory controller comprises increasing a DDR frequency of the memory controller.

3. The method of claim 2, wherein the DDR frequency is equal to or proportional to the operating frequency.

4. The method of claim 1, wherein one of the plurality of processing units comprises a graphics processing unit (GPU), and wherein the active time of the GPU corresponds to a time for the GPU to render data.

5. The method of claim 4, wherein the data comprises one or more frames.

6. The method of claim 1, further comprising, if the determined active time for the plurality of processing units is greater than the active threshold, repeating the monitoring step, the comparing step, and the frequency increasing step until the active time for the plurality of processing units is equal to or less than the active threshold.

7. The method of claim 1, wherein one of the plurality of processing units comprises a central processing unit (CPU).

8. The method of claim 1, further comprising, if the determined active time for the plurality of processing units is less than the active threshold, using a current operating frequency of the memory controller as a starting frequency for a process that adjusts the operating frequency of the memory controller based on idle durations of one or more of the plurality of processing units.

9. The method of claim 1, further comprising:
   operating the memory controller at each one of a plurality of different operating frequencies;
   determining a plurality of active times for the plurality of processing units, each of the plurality of active times corresponding to one of the plurality of different operating frequencies; and
   determining the active threshold based on the plurality of active times.

10. The method of claim 9, wherein determining the active threshold based on the plurality of active times comprises:
    determining a rate of change of active time for the plurality of processing units with respect to operating frequency of the memory controller based on the plurality of active times; and
    determining the active threshold based on an active time at which the determined rate of change is equal to or less than a rate of change threshold.

11. The method of claim 1, wherein increasing the operating frequency of the memory controller comprises increasing a frequency of a clock signal input to the memory controller.

12. The method of claim 1, wherein determining the active time is further based on a weighted sum of the active times of the plurality of processing units, wherein the active time of each of the plurality of processing units in the weighted sum is weighted by a respective weight coefficient that is proportional to a contribution of the respective processing unit to a total power of the plurality of processing units or a total power of a system including the plurality of processing units.

13. A system, comprising:
    a plurality of processing units;
    a memory controller configured to interface the plurality of processing units with a memory; and
    a frequency controller configured to monitor activity of the plurality of processing units to determine an active time for the plurality of processing units by a function of the active time of each of the plurality of processing units and a respective power of each of the plurality of processing units, and wherein the frequency controller is further configured to compare the determined active time for the plurality of processing units with an active threshold, and, if the determined active time for the plurality of processing units is greater than the active threshold, to increase an operating frequency of the memory controller.

14. The system of claim 13, wherein the memory comprises a double data rate (DDR) memory, and the frequency controller is configured, if the determined active time for the plurality of processing units is greater than the active threshold, to increase the operating frequency of the memory controller by increasing a DDR frequency of the memory controller.

15. The system of claim 14, wherein the DDR frequency is equal to or proportional to the operating frequency.

16. The system of claim 13, wherein one of the plurality of processing units comprises a graphics processing unit (GPU), and wherein the active time of the GPU corresponds to a time for the GPU to render data.

17. The system of claim 16, wherein the data comprises one or more frames.

18. The system of claim 13, wherein, after the operating frequency of the memory controller is increased, the frequency controller is configured to monitor the activity of the plurality of processing units to determine a new active time of each of the plurality of processing units, to determine a new active time for the plurality of processing units based on the new active time of each of the plurality of processing units and the contribution of each of the plurality of processing units to the total power of the plurality of processing units or the total power of the system, to compare the determined new active time for the plurality of processing units with the active threshold, and, if the determined new active time for the plurality of processing units is greater than the active threshold, to further increase the operating frequency of the memory controller.

19. The system of claim 13, wherein one of the plurality of processing units comprises a central processing unit (CPU).

20. The system of claim 13, wherein, if the determined active time for the plurality of processing units is less than the active threshold, the frequency controller is configured to set a default frequency of the memory controller at a current operating frequency of the memory controller, to determine an idle duration of one or more of the plurality of processing units at the default frequency of the memory controller, and to adjust the operating frequency of the memory controller based on the determined idle duration of the one or more of the plurality of processing units.

21. The system of claim 20, wherein the frequency controller is configured to compare the determined idle duration of the one or more of the plurality of processing units with an idle time threshold, and to increase the operating frequency of the memory controller if the determined idle duration of the one or more of the plurality of processing units is greater than the idle time threshold.

22. The system of claim 13, further comprising an adjustable clock source configured to output a clock signal to the memory controller, wherein the frequency controller is configured to increase the operating frequency of the memory controller by increasing a frequency of the clock signal.

23. The system of claim 13, wherein the frequency controller is further configured to determine the active time based on a weighted sum of the active times of the plurality of processing units, wherein the active time of each of the plurality of processing units in the weighted sum is weighted by a respective weight coefficient that is proportional to a contribution of the respective processing unit to a total power of the plurality of processing units or a total power of a system including the plurality of processing units.

24. A system, comprising:
one or more processing units;
a memory controller configured to interface the one or more processing units with a memory; and
a frequency controller configured to monitor activity of the one or more processing units to determine an active time of the one or more processing units, to compare the determined active time with an active threshold, and, if the determined active time is greater than the active threshold, to increase an operating frequency of the memory controller;
wherein the one or more processing units comprises a plurality of processing units, and the active time of the one or more processing units is determined by a function of an active time of each of the plurality of processing units and a respective power of each of the processing units.

25. The system of claim 24, wherein the memory comprises a double data rate (DDR) memory, and the frequency controller is configured, if the determined active time is greater than the active threshold, to increase a DDR frequency of the memory controller.

26. The system of claim 25, wherein the DDR frequency is equal to or proportional to the operating frequency.

27. The system of claim 24, wherein the one or more processing units comprise a central processing unit (CPU) or a graphics processing unit.

28. The system of claim 24, wherein the function comprises a weighted sum of the active times of the plurality of processing units, and the active time of each of the plurality of processing units in the weighted sum is weighted by a respective weight coefficient that is proportional to the respective power of the respective processing unit out of a total power of the plurality of processing units or a total power of a system including the plurality of processing units.

29. The system of claim 28, wherein the frequency controller is further configured to adjust the weight coefficient of each of the plurality of processing units based on a respective performance requirement of each of the plurality of processing units.

30. The system of claim 24, wherein the plurality of processing units comprises a central processing unit (CPU) and a graphics processing unit (GPU).

* * * * *